Figure 1:
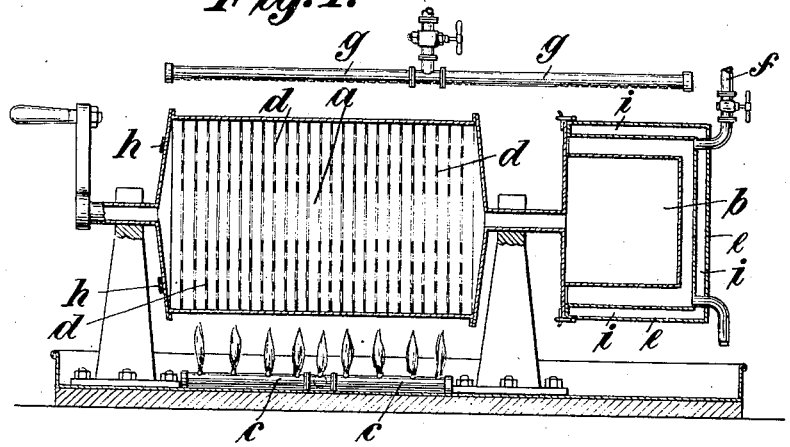

C. WAGENER.
ICE MAKING MACHINE.
APPLICATION FILED NOV. 9, 1909.

958,683.

Patented May 17, 1910.

WITNESSES:

INVENTOR:
Clemens Wagener.

UNITED STATES PATENT OFFICE.

CLEMENS WAGENER, OF BERLIN, GERMANY, ASSIGNOR TO LEOPOLD BICHLER, OF INNSBRUCK, AUSTRIA-HUNGARY.

ICE-MAKING MACHINE.

958,683.  Specification of Letters Patent.  Patented May 17, 1910.

Application filed November 9, 1909. Serial No. 527,050.

*To all whom it may concern:*

Be it known that I, CLEMENS WAGENER, engineer, a subject of the King of Prussia, Emperor of Germany, and residing at 17 Linkstrasse, Berlin, W. 8, Kingdom of Prussia, German Empire, have invented new and useful Improvements in Ice-Making Machines, of which the following is a specification.

The present invention refers to a machine for making ice, particularly in smaller quantities, for use in the household and the like. The principal machines employed for this purpose until now are simple ammonia absorption machines without compression pumps, and vacuum machines. The chief advantage of the ammonia absorption machine consists in the simplicity of its design. The principal disadvantages are firstly the high pressure (over 10 atmospheres) in consequence of which all parts of the machine must be very strong and heavy. Furthermore it is very difficult to keep the packings and joints in perfect order. A further disadvantage is the high temperature, which causes a decomposition of the ammonia so that the result is a comparatively great consumption of refrigerating medium, and lastly the long duration of each operation (from 2 to 4 hours).

The vacuum machine offers the advantage of a low consumption of power with a rapid production of ice. A disadvantage of this type of machine is the working by means of an air-pump producing the high vacuum required of 3 to ½ millimeter mercury column, which pump is difficult to be held in perfect order under continuous service, particularly if in the hands of inexperienced persons, so much the more as with this process almost generally concentrated sulfuric acid is employed, the caustic properties of which no material will be able to withstand for long time. The evaporating of the acid in small plants is besides very inconvenient. Both the types mentioned are further of a high purchase price.

On the contrary the subject of the present invention is a machine for the production of ice, which on the one hand combines the advantages of the two above mentioned types of machines, on the other hand however avoids the chief disadvantages of the same. The new ice making machine is extremely simple. It can be made without any screw joints, without valves and packings, by simple soldering and welding and similar processes, and will remain permanently hermetic and tight. As the machine works with a vacuum, and thus only under atmospheric pressure, it may be made comparatively cheap of light material as sheet metal. Also the working is very cheap, not only in consequence of the low consumption of fuel but also because the evaporation takes place in a vacuum, and for the reason, that the refrigerating medium is not consumed at all. By eliminating the air pump, the greatest disadvantage of the vacuum machine has been remedied, whereas the comparatively short duration of the operation (of about ½ hour) has been retained.

In the accompanying drawing the present invention has been exemplified.

Figure 2:
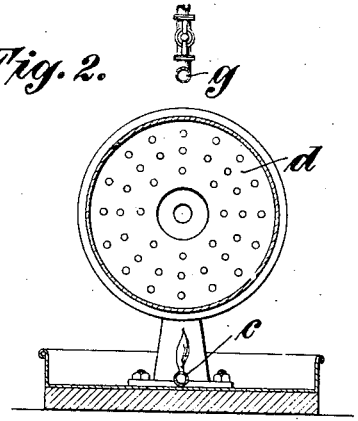
Figure 3:
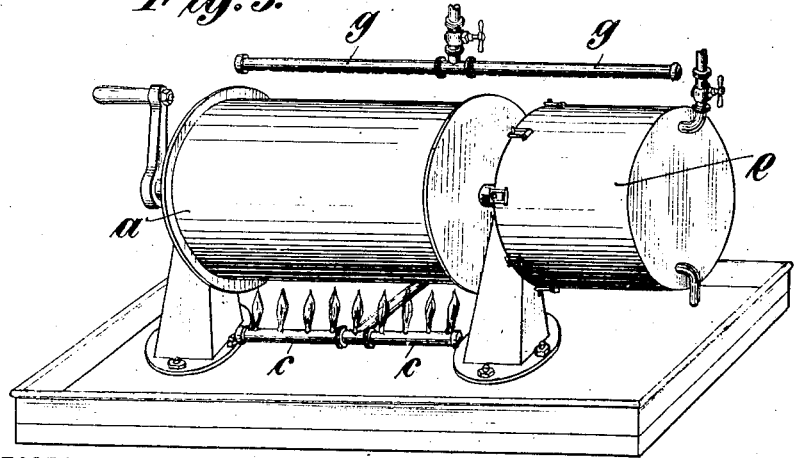

Figure 1 is a longitudinal section through the machine. Fig. 2 is the machine in transverse section and in Fig. 3 the machine is shown in perspective.

The boiler $a$ is partly filled with the absorbing liquid, which acts as a heat transferring medium and must be of such composition that it will not readily freeze. After this liquid has been filled in, the machine is evacuated, which may be done either by pumping or by boiling, and is then shut off by suitable means permanently against the atmosphere. The absorbing liquid should be indifferent toward the material used. Particularly suitable for the purpose a solution of chlorid of zinc has been found, however also a concentrated solution of soda or other strongly hygroscopic substances will be serviceable.

Before operating the machine, part of the absorbing liquid is transferred from the boiler ($a$) to the evaporator ($b$), for instance, by turning the machine over, in order to form with the water passing over from the boiler ($a$) due to the subsequent distillation the cold producing liquid.

The absorbing liquid is heated by means of the heating apparatus $c$ and the water contained in said liquid will pass over in form of steam into evaporator $b$, while said evaporator $b$ is cooled by water flowing over it, so that the steam will be condensed on its inside walls. For preventing the boiler from boiling over, a number of metal disks or webs $d$ are provided in boiler $a$ (Fig. 2 showing such a disk or web perforated), said disks or webs being made of sheet metal or wire or the like material, which being in good heat conducting connection with the walls of the boiler enable a rapid conduction of the heat to the liquid therein. The disks or webs have at the same time the purpose of producing as large as possible a surface for the rapid absorption. The rotation of the machine about its longitudinal axis by means of which the aforesaid disks operate simultaneously as stirring mechanism so that a special stirring device is not required, serves the same purpose. The same purpose is also effected by the provision in the machine of loose material such as slag wool, fine metal shavings and the like. This loose material prevents the liquid from boiling over and thus also prevents the latter from being drawn from one container to another which is a defect that easily occurs when the liquid is permitted to boil over. On the rotation of the machine this material retains a part of the liquid so that a large condensing or absorbing surface is provided for the latter. By the employment of metal shavings or the like, a conduction of heat from the surface of the machine to the interior thereof and vice versa is effected.

After the distillation has been completed, the heating flame is removed. Thereupon the ice generator, a cylindrical vessel, $e$, is placed over the evaporator $b$, secured in position by suitable means, and filled with water through one of the supply pipes $f$, which are again closed after the ice generator has been filled. On its outside the ice generator is covered with insulating material $i$. Now the boiler $a$ is cooled with water whereby the water which passed over into evaporator $b$ will rapidly evaporate, thereby producing a considerable refrigeration so that after a very short time the generation of ice on the surface of evaporator $b$ will commence. The water for cooling the receptacles $a$ and $b$ respectively may be suitably supplied through a rose or shower $g$.

In order to prevent a steam pressure being produced in case of careless attendance, say by leaving the heating flame burning, safety fusible plugs $h$ made of easily fusible metal are provided, which will fuse when a certain temperature is reached, and thereby open a communication with the atmosphere.

Having thus described my invention, what I claim and desire to secure by Letters Patent of the United States is:

1. In an ice making machine, the combination of a rotatably mounted boiler, an evaporator rotatably mounted on the same axis and communicating with the boiler, and a number of disks having a plurality of perforations and one large aperture in the center and arranged in the interior of the machine in communication with its walls and rotating with them, for the purpose specified.

2. In an ice making machine, the combination of a rotatably mounted boiler, an evaporator rotatably mounted on the same axis and communicating with said boiler, a number of disks having a plurality of perforations and one large aperture in the center and arranged in the interior of the machine in communication with its walls and rotating with them, and a loose material, such as metal shavings, provided in the interior of the machine, substantially as described.

In witness whereof I have hereunto signed my name this 26th day of October 1909, in the presence of two subscribing witnesses.

CLEMENS WAGENER.

Witnesses:
HENRY HASPER,
WOLDEMAR HAUPT.